Oct. 9, 1951     F. A. GALLIK     2,570,337
DEFLECTOR FOR AUTOMOBILE WINDOWS
Filed Sept. 8, 1949
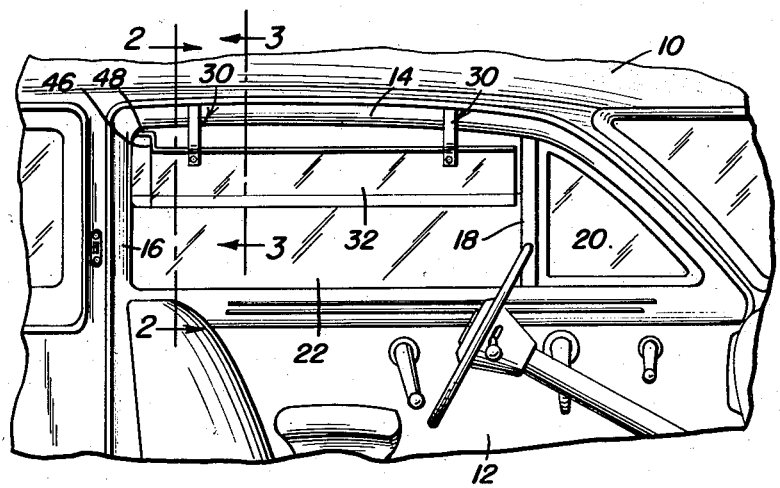
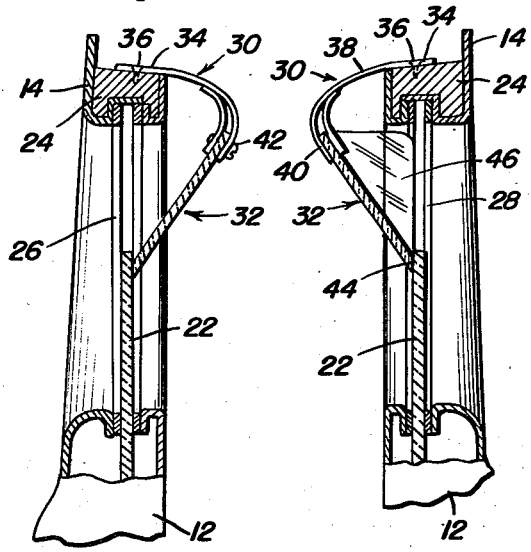
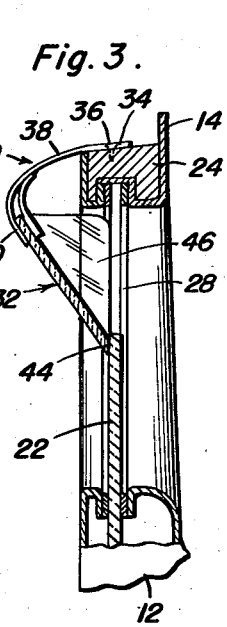
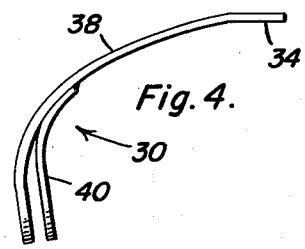
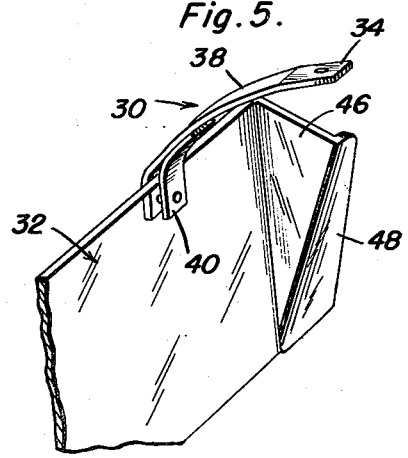
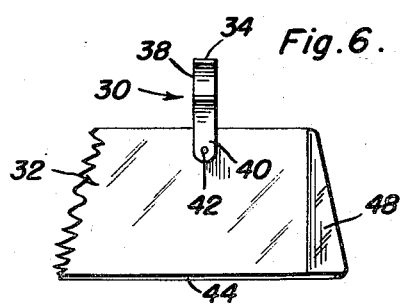
Frank A. Gallik
INVENTOR.
BY *Clarence A. O'Brien*
*and Harvey B. Jackson*
Attorneys Patented Oct. 9, 1951

2,570,337

UNITED STATES PATENT OFFICE 2,570,337

DEFLECTOR FOR AUTOMOBILE WINDOWS

Frank A. Gallik, North Tarrytown, N. Y.

Application September 8, 1949, Serial No. 114,523

3 Claims. (Cl. 98—2)

This invention relates generally to shields and more particularly to a deflector for use with an automobile window, ordinarily upon the door of the automobile, as well as upon buses, trucks and the like.

A primary object of this invention is to provide a wind deflector to prevent draft when the window is opened, while allowing ventilation.

Another object of this invention is to provide for proper draft prevention and proper ventilation when it is raining, since the windows may be partially open without allowing the rain to enter the vehicle.

Still another object of this invention is to provide a shield against unwanted bright rays in sunlight.

A last object to be mentioned specifically is to provide a shield of the general character mentioned above which will be relatively inexpensive and practicable to manufacture, simple to install and to use, safe in operation, and which will be generally efficient and durable in use.

With these objects definitely in view, this invention resides in certain novel features of construction, combination and arrangement of elements and portions as will be hereinafter described in detail in the specification, particularly pointed out in the appended claims, and illustrated in the accompanying drawing which forms a material part of this application, and in which:

Figure 1 is a fragmentary elevational view of an automobile with this invention operatively applied on a door thereof;

Figure 2 is a vertical cross sectional view, taken on the line 2—2 in Figure 1 and looking forwardly;

Figure 3 is a view similar to Figure 2 but looking rearwardly;

Figure 4 is an enlarged detail view of one of the elements hereinafter referred to as brackets;

Figure 5 is a fragmentary view of the deflector removed from the automobile door; and Figure 6 is an elevational view of the deflector shown in Figure 5.

Similar characters of reference designate similar or identical elements and portions throughout the specification and throughout the different views in the drawings.

Referring now to the drawing in detail, this invention is adapted to be used with an environment including an automobile or the like fragmentarily illustrated at 10 in Figure 1. The illustrated vehicle 10 includes a door 12 having a top rail 14, a rear vertical rail 16 and a vertical dividing post 18 between the conventional pivoted ventilation sash of the door, indicated at 20, and the vertically sliding sash 22, as well as a complement of other parts which do not enter directly into the functioning of this invention.

It may also be noted that the door will ordinarily have a top rail 14 fitted with a filler 24 or analogous structure, and it will also be noteworthy that the vertically sliding sash 22 is guided by guide rails 26 in the dividing post 18 and similar guide rails 28 in the rear vertical rail or post 16.

Each deflector unit in this invention is comprised of two main portions, a pair of brackets generally indicated at 30 and a shield 32. The brackets are spaced apart as clearly indicated in Figure 1 and each bracket includes an upper terminal portion 34 which is apertured to receive screws 36 or similar fastening members whereby the bracket is mounted rigidly upon the filler 24 in the top rail 14 of the door 12, or to analogous structure in that portion of the door, if such door is constructed differently from that illustrated in the drawing. Each bracket also includes a shank portion 38 which is a relatively inflexible strap extending arcuately downwardly on the inside of the door, and the shank terminates in a bifurcated portion 40, the arms of this portion being parallel and spaced apart to receive the shield 32, the upper edge of the shield being inserted between the arms of the bifurcated portion and fastened rigidly therein by means of screws or bolts 42, it being conceivable that other fastening means might be used. It should be carefully noted that the bifurcated portion 40 is disposed downwardly and toward said door, and the lower edge portion of the shield, indicated at 44, will be ajacent to the upper edge of the vertically sliding sash 22 when this sash is raised so as to close approximately one half of the window opening, as clearly illustrated in Figures 2 and 3. The said lower edge 44 of the shield may be beveled as is also indicated in Figures 2 and 3. The shield 32 will be constructed of substantially rigid material, impervious to water and opaque to certain light rays, and in the embodiment illustrated in the drawings, the shield will be generally rectangular in shape. Sheet material, such as certain commercial plastic material available in different colors to blend with the color of the vehicle, will ordinarily be used.

The rear end portion of the shield 32 has an integral substantially vertical end plate of general triangular conformation, with the apex of the triangle depending, to engage the door adjacent the rear edge of the door, this end plate being indicated best in Figure 5 at 46. It is preferred that the end plate 46 be provided with a rearwardly extending lug 48 to fit into the channel between the vertical guide rails 26 in the rear rail or post 16 of the door, it being understood that this lug 48 will be of small thickness, and that the vertically sliding sash 22 will still be accommodated in the channel of the guide rails 26.

It will, of course, be understood that the deflectors will be used on each side of the vehicle and that the deflectors may be mounted on other structure than that represented in the drawing, although the deflector is primarily developed for use with a door of an automobile or the like.

The operation of this invention will be clearly understood from a consideration of the foregoing description of the mechanical details thereof, taken in conjunction with the drawing and the above recited objects. It will be obvious that unwanted drafts are prevented and that the end plate 46 will prevent escape of air directly rearwardly from the space between the shield and the door. The end plate 46 and lug 48 comprise reinforcing members in secondary function. The manner in which rain is prevented from entering the vehicle and the functioning of the shield to protect the occupants of the vehicle against harmful rays of the sun will be obvious. Further description would appear unnecessary.

Having described the invention, what is claimed as new is:

1. A deflector for use with an automobile door having a vertically slidable adjustable sash, comprising a pair of brackets and a shield of sheet material, each bracket having a terminal portion secured to the top of said door, a shank portion extending arcuately downwardly on the inside of the door and a bifurcated portion spaced from said door and extending downwardly and toward said door, said shield having its upper edge portion fixed in said bifurcated portions and its lower edge adjacent said sash, said shield being rigid, impervious to water and opaque to certain light rays, said shield having a substantially vertical end piece of generally triangular configuration, said end piece being arranged at an angle to said shield and extending toward the sash, and said end piece contacting said sash to prevent air from escaping directly rearwardly from the space between said shield and the door.

2. A deflector according to claim 1 and wherein said lower edge of the shield extends horizontally along the upper edge of the sash when said sash is substantially half closed.

3. The combination of claim 1 and the inner edge of said end piece having a lug fixed thereto and located between the sash and one side of the channel in which said sash is operable.

FRANK A. GALLIK.

REFERENCES CITED

The following references are of record in the file of this patent:

UNITED STATES PATENTS

| Number | Name | Date |
| --- | --- | --- |
| 1,592,667 | Lewis | July 13, 1926 |
| 2,011,667 | Wilson | Aug. 20, 1935 |
| 2,017,996 | Stonehouse | Oct. 22, 1935 |